United States Patent [19]

Okano

[11] Patent Number: 5,119,209
[45] Date of Patent: Jun. 2, 1992

[54] PICTURE IMAGE REPRODUCING APPARATUS HAVING A SAMPLING CIRCUIT FOR SAMPLING AN OUTPUT OF THE TIME BASE ERROR CORRECTING CIRCUIT

[75] Inventor: Takashi Okano, Saitama, Japan

[73] Assignee: Pioneer Electronic Corporation, Tokyo, Japan

[21] Appl. No.: 417,125

[22] Filed: Oct. 4, 1989

[30] Foreign Application Priority Data

Oct. 13, 1988 [JP] Japan ................ 63-255946

[51] Int. Cl.$^5$ .............................. H04N 5/95
[52] U.S. Cl. .................... 358/339; 358/338; 358/342; 360/10.1; 360/10.3
[58] Field of Search .......... 358/339, 335, 12, 13, 358/312, 337, 338, 340, 321; 360/10.1, 10.3, 36.2, 61, 64

[56] References Cited

U.S. PATENT DOCUMENTS

| | | | |
|---|---|---|---|
| 4,110,785 | 8/1978 | Dischert et al. | 358/339 |
| 4,227,204 | 10/1980 | Rossi | 358/13 |
| 4,485,412 | 11/1984 | Sugiyama et al. | 358/310 |
| 4,772,975 | 9/1988 | Azuma | 360/10.1 |

FOREIGN PATENT DOCUMENTS

| | | |
|---|---|---|
| 274255 | 7/1988 | European Pat. Off. |
| 283263 | 9/1988 | European Pat. Off. |
| 2702964 | 8/1977 | Fed. Rep. of Germany |
| 3146964 | 5/1985 | Fed. Rep. of Germany |
| 3611257 | 10/1986 | Fed. Rep. of Germany |
| 61-47035 | 10/1986 | Japan |

OTHER PUBLICATIONS

Patent Abstracts of Japan, vol. 12/No. 221 (Jun. 23, 1988), Japanese Application No. 61-160022.

*Primary Examiner*—Roy N. Envall, Jr.
*Assistant Examiner*—Thai Tran
*Attorney, Agent, or Firm*—Sughrue, Mion, Zinn, Macpeak & Seas

[57] ABSTRACT

A video signal reproduction apparatus with time base error correction and synchronization correction. The synchronization correction circuit is used only where the condition of the recorded video signal is such that synchronization correction is necessary. The latter circuit includes an image memory for storing a field of video data. The video data input to the image memory is at a relatively low data rate to enable use of a relatively low capacity image memory.

6 Claims, 2 Drawing Sheets

PICTURE IMAGE REPRODUCING APPARATUS HAVING A SAMPLING CIRCUIT FOR SAMPLING AN OUTPUT OF THE TIME BASE ERROR CORRECTING CIRCUIT

BACKGROUND OF THE INVENTION

The present invention relates to a picture image reproducing apparatus for reproducing a video signal which has been recorded on a disk-shaped recording medium.

In a picture image reproducing apparatus for reproducing a video signal which has been recorded on a disk-shaped recording medium, the relative speed between the recording disk and a pickup is controlled by controlling the rotary speed of a disk motor, which rotates the recording disk. At the same time, the reproduced signal provided by the pickup is supplied to a line memory to correct the time base error caused by any eccentricity of the disk and any irregular rotation thereof. This is referred to as time axis correction of the reproduced video.

Further, in the picture image reproducing apparatus of a CLV system (constant linear velocity rotary system), such as a video disk player, to enable a so-called track jumping operation, a video signal corresponding to at least one field is stored in an image memory and is then read out by a signal that is synchronized with a reference synchronization signal (horizontal and vertical synchronization signals). This is referred to as synchronization conversion or correction. The video signal reproduced at the special reproducing mode when a track jumping operation is performed, will be referred to as discontinuous video, as compared with continuous video that is produced during normal reproducing mode or is in no need of synchronization conversion.

FIG. 3 is a block diagram showing the construction of such a conventional picture image reproducing apparatus.

In this figure, a recording disk 1 is rotated by a disk motor 2, and an RF signal S1 is read by an optical pickup 3. The operation of the optical pickup 3 is controlled by a servo circuit 4. Servo circuit 4 performs a focus servo control function to properly focus a laser beam in the optical pickup 3 onto the reflecting face of disk 1 even when the disk is vibrated, a tracking servo control function for causing the pickup to follow a predetermined track, and an optical system feed servo control function for moving the optical pickup 3 in the radial direction of disk 1, etc. When a still picture is reproduced and a special reproduction operation is performed, such as multispeed reproduction, etc., a track jump is performed in the radial direction of the disk in response to a jump command.

A demodulating circuit 5 is composed of an FM-demodulating circuit, etc., and operates to demodulate RF signal S1 and provide at its output a demodulated video signal S2, which is applied to an A/D converting circuit 6 and control circuit 7. A/D converting circuit 6 converts video signal S2 into a digital video siqnal S3, in response to clock signal CK supplied from control circuit 7, and supplies the converted signal to a line memory 8. The line memory 8 stores digital video signal S3 on a line-by-line basis at addresses determined by write address signal WD1 supplied from control circuit 7 and reads out the stored signal as digital video signal S4 in response to a read-out address signal RD1 supplied from control circuit 7, and stores this read signal to image memory 9.

Clock signal CK supplied from control circuit 7 to A/D converting circuit 6 is synchronized with the horizontal synchronization signal of video signal S2 demodulated by demodulating circuit 5. Write address signal WD1 supplied to line memory 8 is an output of a write address counter performing the counting operation by this clock signal CK and sequentially changing its output. Read-out address signal RD1 is an output of a read-out address counter for performing the counting operation in response to an output of a fixed oscillator. The fixed oscillator is normally a crystal oscillator since it is necessary for the fixed oscillator to have a very stable output frequency.

A video signal S3 with jitter written into line memory 8 is read out by read-out address signal RD1 in synchronization with the output signal of the fixed oscillator having a stable frequency. Thus, the video signal S4 in which there has been a time axis error, will be free of jitter.

The image memory 9 has a memory capacity for storing a field of signal data. The operation of image memory 9 is controlled by write address signal WD2 and read-out addres signal RD2 from control circuit 7 such that image memory 9 sequentially performs a write operation every time video signal S4 is read out of line memory 8 and sequentially performs a read-out operation every time a write operation is performed. Video signal S5 read out of image memory 9 is supplied to a D/A converting circuit 10 to convert this signal to an analog signal and is then outputted as a reproduced video signal S6.

The read-out address signal RD2 is in phase-synchronization with the reference synchronization signal. By such a construction, even when a video signal having a discontinuous synchronization signal is written onto image memory 9, for example when a track jumping operation is performed, a video signal synchronized with the horizontal and vertical synchronization signals can be provided by reading the video signal out of image memory 9 by address signal RD2 synchronized with the reference synchronization signal.

As is known, the digital signal S3 faithfully represents the analog input S2, if S2 is sampled by the A/D converter at a frequency equal to or greater than twice the maximum frequency of S2. Absent such a high sampling frequency, the resulting signal will include a noise component, referred to as aliasing noise. If the appropriate high frequency sampling frequency is used, a video signal having no aliasing noise over a wide band can be provided. However, in the latter case, it is necessary that line memory 8 and image memory 9 have large memory capacities. In particular, the memory capacity of image memory 9 is required to be large and, therefore, is expensive.

The memory capacity of each of line memory 8 and image memory 9 can be reduced by lowering the frequency of the clock signal CK, but this results in reflected noise over a wide band being generated when the picture image is reproduced. If high frequency components are removed from S2 before A/D conversion in circuit 6, the generation of reflected noise at the lower clock frequency can be restrained, but the resolution of the reproduced video is reduced.

When the above circuits are constructed on a single chip, it is desirable that the area occupied by image memory 9 be small in order to increase the production yield of the chips. This is because the image memory 9 occupies a large portion of the chip area. The larger the memory, the greater the chance of processing errors, and concomitantly, the lower the yield. A smaller memory will have a smaller capacity, and this would require A/D conversion of S2 at a lower frequency clock signal CK with disadvantages for the image quality as mentioned above.

Further, in the conventional apparatus shown in FIG. 3, when a memory having a single field capacity is used as the image memory 9, it is known that odd and even fields written to the memory may be inverted with respect to each other at the time of the read-out operation, and therefore the so-called replacement of fields may be caused, since it is not certain that whether even field or odd field is first stored in the image memory having merely a single field capacity, whereas a synchronizing signal used for the read-out operation is certainly preset to start scanning odd field at first. When such a phenomenon occurs while a code signal is inserted onto a specified line in a vertical blanking period of an even field for example with respect to the video signal, there is a case in which this code cannot be read due to the replacement of fields.

SUMMARY OF THE INVENTION

Therefore, an object of the present invention is to provide a picture image reproducing apparatus, having an image memory with relatively low capacity, for converting a video signal having a discontinuous synchronization signal into a video signal having a continuous synchronization signal.

The present invention resides in a picture image reproducing apparatus comprising time base error correcting means for correcting the time base error of a video signal read out of a recording medium; and synchronization converting means for storing an amount of data less than the data amount of the video signal read out of said time axis error correcting means per unit time and reading out the data in phase with and in synchronization with a reference synchronization signal at the read-out time; an output of said time axis error correcting means being selectively supplied at the normal reproducing mode, an output of said synchronization converting means being selectively supplied at a special reproducing mode.

Accordingly, it is necessary to read a code inserted onto a specified line of a specified field at the normal reproducing mode in which the reproducing operation is continuously performed along a track in a video disk player. On the other hand, it is not necessary to read the code at the special reproducing mode in which the reproducing operation is performed by jumping the track repeatedly.

In the present invention, the synchronization converting processing is required at the special reproducing mode, and is not necessarily performed at the normal reproducing mode when the reproducing operation is sequentially performed continuously with respect to the track. The image having a high resolution is required by performing the reproduction in a wide band of the video signal at the normal reproducing mode when it is necessary to accurately reproduce the recorded video signal as much as possible. At the special reproducing mode, the operability is more important than the image quality. In consideration of such a situation, the output of the time axis error correcting means for correcting the time base error of the video signal read out of the recording medium is selectively provided at the normal reproducing mode. At the special reproducing mode the output corrected by the time axis error correcting means is processed by the synchronization converting means and is thereafter supplied therefrom. Accordingly, the synchronization converting means samples and stores the amount of data less than the data amount of the video signal read out of the time axis error correcting means per unit time, thereby reducing the memory capacity of the image memory.

DETAILED DESCRIPTION OF PREFERRED EMBODIMENTS

Figure 1:
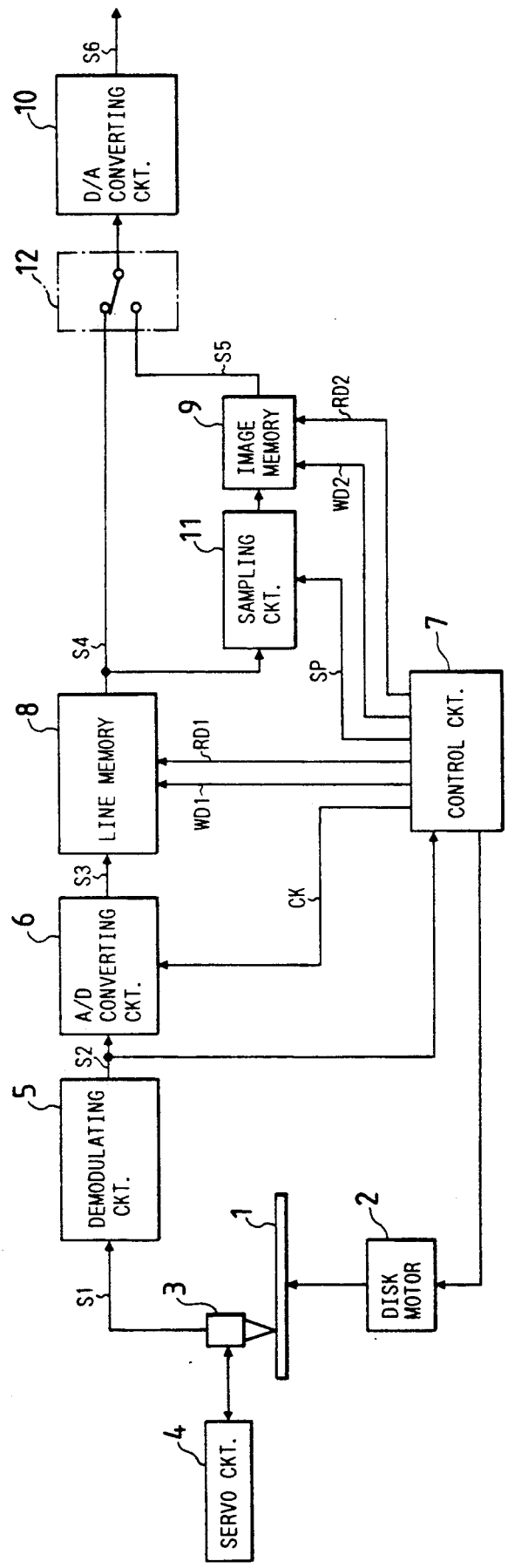
FIG. 1 is a block diagram showing a picture image producing apparatus according to an embodiment of the present invention.

FIG. 1 is a block diagram showing a picture image reproducing apparatus in one embodiment of the present invention. In this figure, the same portions as those in FIG. 3 are designated by the same reference numerals.

Figure 3:
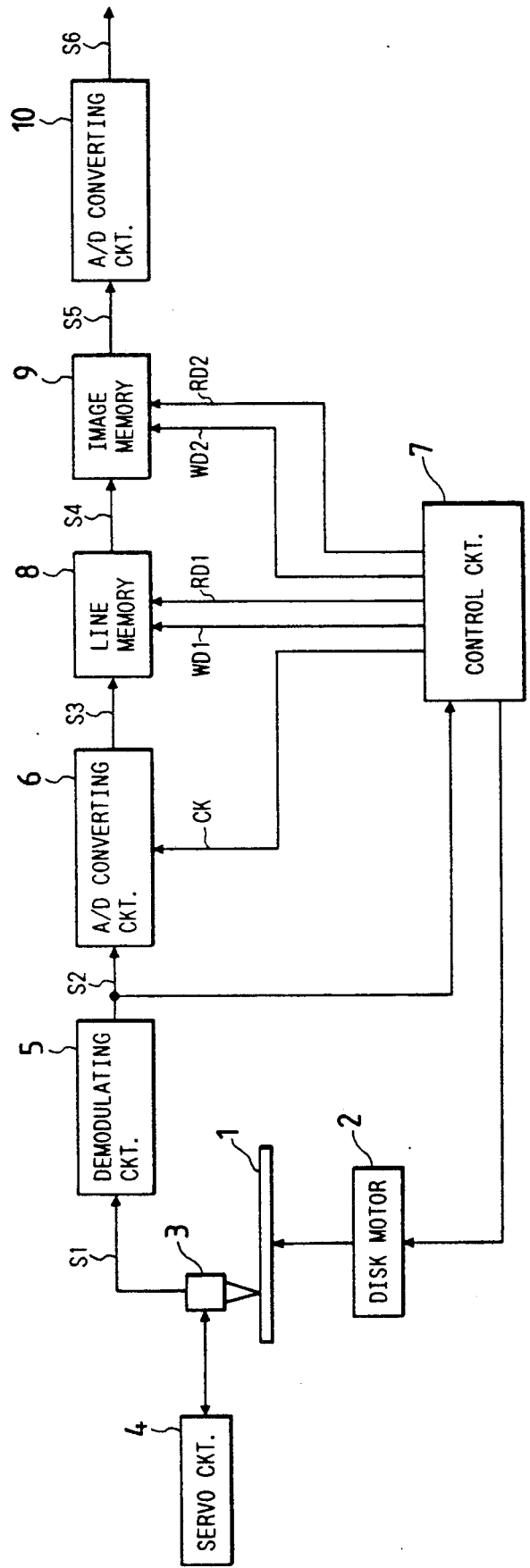
FIG. 3 is a block diagram showing a conventional picture image reproducing apparatus.

In the construction shown in FIG. 1, recording disk 1, disk motor 2, optical pickup 3, servo circuit 4, demodulating circuit 5, A/D converting circuit 6, control circuit 7 and line memory 8 are connected to each other, similar to those in FIG. 3.

An output of line memory 8 is connected to a sampling circuit 11 and a switching circuit 12. An output of the sampling circuit 11 is connected to image memory 9. Switching circuit 12, under control of a system controller (not shown), switches outputs of the line memory 8 and the image memory 9 and selectively connects these memories to D/A converting circuit 10.

In such a construction, at the normal reproducing mode when the reproducing operation is sequentially performed continuously with respect to the track of recording disk 1, switching circuit 12 is switched onto the side of line memory 8, as shown in FIG. 1, to output video signal S4, corrected by line memory 8 with respect to its time axis, to D/A converting circuit 10. At a special reproducing mode when a still picture is reproduced and a multispeed reproduction, etc. are performed by jumping tracks, switching circuit 12 is switched onto the side of image memory 9 to output video signal S5, processed by sampling circuit 11 and image memory 9 with respect to the synchronizing conversion, to D/A converting circuit 10.

The processing with respect to the synchronizing conversion will next be described as an example for the case in which the amount of data in video signal S4 is reduced by one half in sampling circuit 11 and is then supplied to image memory 9.

A subcarrier signal modulated by a color signal is superimposed on a high frequency region of the video signal. Therefore, it is desirable that frequency $F_{sp}$ of sampling signal SP is practically set to a frequency which is about 1.5 to 2 MHz higher than a Nyquist frequency, which is twice the subcarrier frequency $F_{sc}$, even when frequency $F_{sp}$ is reduced. In the case of the NTSC system, subcarrier frequency $F_{sp}$ is 3.58 MHz. However, when 576Fh(Fh:horizontal synchronization frequency = 15.734 KHz) for example is selected as a write clock frequency with respect to image memory 9, frequency $F_{sp}$ of sampling signal SP becomes $F_{sp} = 9.06$ MHz so that it is possible to reproduce an NTSC signal in a band about 4.5 MHz which does not include any reflected noise.

Since the output of line memory 8 is directly supplied to converter 10 at the normal reproducing mode, a video signal which is A/D-converted by a clock signal CK having a frequency of 18.12 MHz (twice that of sampling signal SP) can be provided from A/D converting circuit 6. Accordingly, the NTSC signal in a band of about 9 MHz and not including any aliasing noise can be reproduced so that the video signal having a sufficient resolution can be obtained.

As mentioned above, when the sampling conversion is performed by sampling circuit 11 at a ratio of 2:1, the memory capacity of image memory 9 is one half that would be required in the absence of any sampling conversion. Further, such a construction is simply provided by thinning out the video signal coming out of line memory 8. In the example, this is done by the sampling circuit 11 sampling every other sample out of line memory 8.

As another method for performing the sampling conversion at a ratio of 2:1, it is considered that the A/D conversion is performed at a frequency four times the subcarrier frequency and the write operation with respect to the image memory is performed at a frequency twice the subcarrier frequency. In this method, the sampling operation is performed at a frequency less than the Nyquist frequency, resulting in aliasing noise being included in the video signal. However, this noise can be removed by using a technique disclosed in Japanese published patent No. 61-47035, for example. In accordance with this method, it is possible to further reduce the memory capacity of the image memory.

Figure 2:
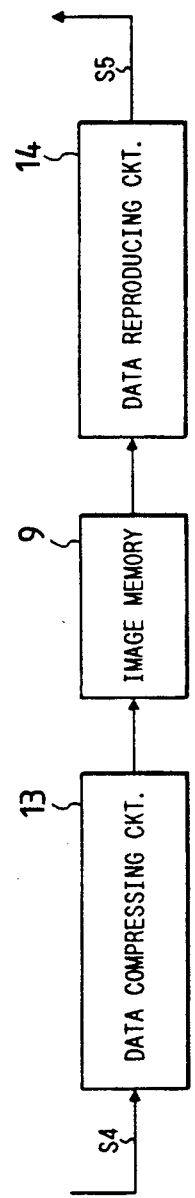
FIG. 2 is a block diagram showing a main portion of the apparatus according to another embodiment of the present invention.

The above-mentioned embodiment relates to the sampling conversion at ratio 2:1 at which video signal S4 is thinned out by sampling circuit 11 to reduce the data amount to one half. However, as shown in FIG. 2, a further complicated data compressing circuit 13 may be used when the video signal written to image memory 9 is reduced with respect to the output from line memory 8. In this case, it is necessary to provide a data reproducing circuit 14 in the output of image memory 9 in the case of sub-Nyquist sampling.

In the embodiment mentioned above, the outputs of line memory 8 and image memory 9 are switched by switching circuit 12, but the present invention is not limited to this case. For example, two D/A converting circuits may be disposed in the outputs of line memory 8 and image memory 9, respectively, such that outputs of the respective D/A converting circuits are selectively switched by switch 12.

In accordance with the picture image reproducing apparatus in the present invention, the video signal at a high sampling rate corrected with respect to the time axis is outputted during the normal reproducing mode. At the special reproducing mode, the sampling rate of the video signal corrected with respect to the time axis is reduced and the video signal is written to the image memory so as to perform the synchronizing conversion processing for outputting the video signal in a phase synchronized with the reference synchronization signal. Accordingly, it is possible to reduce the memory capacity of the image memor without lowering the resolution at the normal reproducing mode.

What is claimed:

1. In a video reproduction system of the type which produces a continuous video signal and which produces a discontinuous video signal, and having a time base error correcting means for correcting a time base error of a reproduced video signal, and a synchronization converting means for storing video data input thereto and reading out said video data in phase synchronization with a reference synchronization signal, the improvement comprising:

sampling means for sampling an output of said time base error correcting means and supplying the output therefrom as input video data to said synchronization converting means, and switching means for supplying the output of said time base error correcting means to an output of said video reproduction system during a first video reproducing mode, and for supplying an output of said synchronization converting means to the output of said video reproduction system during a second video reproducing mode.

2. The improvement of claim 1, wherein said time base error correcting means comprises a digital line memory.

3. The improvement of claim 2, wherein said synchronization converting means comprises a single digital field memory.

4. The improvement of claim 3, wherein said time axis converting means further comprises a demodulation means for demodulating said reproduced video signal, and converting means for A/D converting the demodulated reproduced video signal, and providing the resulting digitized samples to said digital line memory.

5. The improvement of claim 4, wherein said sampling means comprises a digital sampler which samples the digitized samples out of said line memory at a rate less than the sampling rate of said converting means.

6. The improvement of claim 5, wherein the sampling rate of said digital sampler is half that of said converting means.

* * * * *